United States Patent
Donaldson

(10) Patent No.: US 10,751,950 B2
(45) Date of Patent: Aug. 25, 2020

(54) PIPE FUSION MACHINE

(71) Applicant: McElroy Manufacturing, Inc., Tulsa, OK (US)

(72) Inventor: Paul John Donaldson, Broken Arrow, OK (US)

(73) Assignee: MCELROY MANUFACTURING, INC., Tulsa, OK (US)

( * ) Notice: Subject to any disclaimer, the term of this patent is extended or adjusted under 35 U.S.C. 154(b) by 99 days.

(21) Appl. No.: 15/709,470

(22) Filed: Sep. 20, 2017

(65) Prior Publication Data

US 2019/0084250 A1    Mar. 21, 2019

(51) Int. Cl.
*B29C 65/00* (2006.01)
*B29C 65/78* (2006.01)
(Continued)

(52) U.S. Cl.
CPC ........ *B29C 66/92211* (2013.01); *B29C 65/02* (2013.01); *B29C 65/20* (2013.01); *B29C 65/7841* (2013.01); *B29C 66/114* (2013.01); *B29C 66/1142* (2013.01); *B29C 66/1162* (2013.01); *B29C 66/5221* (2013.01);
(Continued)

(58) Field of Classification Search
CPC ......... B29C 66/71; B29C 65/02; B29C 65/20; B29C 65/7841; B29C 66/114; B29C 66/1142; B29C 66/1162; B29C 66/5221; B29C 66/5223; B29C 66/5229; B29C 66/5344; B29C 66/73921; B29C 66/8167; B29C 66/8223; B29C 66/8242; B29C 66/92211; B23K 37/04; B23K 37/0535; B23K 37/0417; B23K 37/0435; B23K 37/0443; B29K 2023/00; B29K 2027/06; B29K 2077/00; B29L 2023/22; B25B 1/00; B25B 1/02; B25B 1/04; B25B 1/20; B25B 1/22; B25B 1/2421; B25B 1/2436; B25B 5/00; B25B 5/02; B25B 5/04;
(Continued)

(56) References Cited

U.S. PATENT DOCUMENTS 2,538,640 A * 1/1951 Click .................. B25B 1/22
                                                       269/71
4,008,118 A    2/1977 Wesebaum et al.
(Continued)

FOREIGN PATENT DOCUMENTS

CN    208469083    *  9/2017
DE        2734911 A1    2/1979
(Continued)

OTHER PUBLICATIONS

CN 208469083 translation, Espacenet website (Year: 2019).*
(Continued)

*Primary Examiner* — Joseph J Hail
*Assistant Examiner* — Robert C Moore
(74) *Attorney, Agent, or Firm* — Frank J. Catalano; Gable Gotwals

(57) ABSTRACT

One fusion machine can butt or socket fuse polyolefin pipes and fittings in straight alignment or at inwardly or outwardly mitered universal angles from 0° to 45° for butt fusion and from 0° to 10° for socket fusion. The machine is manually driven, hydraulically monitored and operated in all configurations from one side of the machine.

3 Claims, 14 Drawing Sheets

(51) Int. Cl.
*B29C 65/02* (2006.01)
*B29C 65/20* (2006.01)
*B29L 23/00* (2006.01)

(52) U.S. Cl.
CPC ...... *B29C 66/5223* (2013.01); *B29C 66/5229* (2013.01); *B29C 66/5344* (2013.01); *B29C 66/71* (2013.01); *B29C 66/73921* (2013.01); *B29C 66/8167* (2013.01); *B29C 66/8223* (2013.01); *B29C 66/8242* (2013.01); *B29L 2023/22* (2013.01)

(58) Field of Classification Search
CPC ....... B25B 5/101; B25B 5/068; B25B 1/2484; B25B 5/10; F16L 1/09; F16L 1/10
USPC .......................... 269/60, 90, 97, 71; 285/331
See application file for complete search history.

(56) References Cited

U.S. PATENT DOCUMENTS

| | | | |
|---|---|---|---|
| 4,640,732 A | 2/1987 | Stafford | |
| 5,305,510 A | 4/1994 | Croft et al. | |
| 5,406,587 A | 4/1995 | Horwitz et al. | |
| 5,464,496 A * | 11/1995 | Wilson | B29C 66/1142 156/499 |
| 5,527,406 A * | 6/1996 | Brath | B29C 65/7802 156/304.2 |
| 6,550,514 B1 * | 4/2003 | Andrew | B29C 65/2084 156/499 |
| 6,688,362 B1 * | 2/2004 | Meirana | B29C 65/2084 156/499 |
| 7,731,297 B1 * | 6/2010 | Ozanich | B60P 1/283 298/23 MD |
| 2012/0068394 A1 * | 3/2012 | Baker | B25B 1/103 269/45 |
| 2013/0038009 A1 * | 2/2013 | Lee | B25B 1/02 269/90 |
| 2014/0020231 A1 * | 1/2014 | Raczuk | B25B 27/10 29/525.01 |
| 2014/0069531 A1 * | 3/2014 | Jaffrey | E21B 33/076 137/553 |

FOREIGN PATENT DOCUMENTS

| | | |
|---|---|---|
| EP | 0027225 A1 | 4/1981 |
| EP | 0602960 A1 | 6/1994 |
| FR | 2175981 A1 | 10/1973 |
| FR | 2644724 A1 | 9/1990 |
| JP | H09174691 A | 7/1997 |
| JP | 2000167933 A | 6/2000 |
| JP | 2000167934 A | 6/2000 |
| WO | 2017018961 A2 | 2/2017 |

OTHER PUBLICATIONS

Ritmo S.P.A., "Gamma 160 Butt Welding Machine Product Manual", 2016 (three unnumbered pages from catalog).
W. Dommer Sohne GmbH, "Product Manual for WIDOS Maxiplast Heating Element Butt Welding Machine", Jul. 1, 2013 (Cover page from product manual and pp. 15, 30, 31, 32/1, 32/2).
W. Dommer Sohne GmbH, "Product Manual for WIDOS Miniplast 2 Heating Element Butt Welding Machine", Apr. 14, 2014 (Cover page from product manual and pp. 14, 28, and 29).

\* cited by examiner

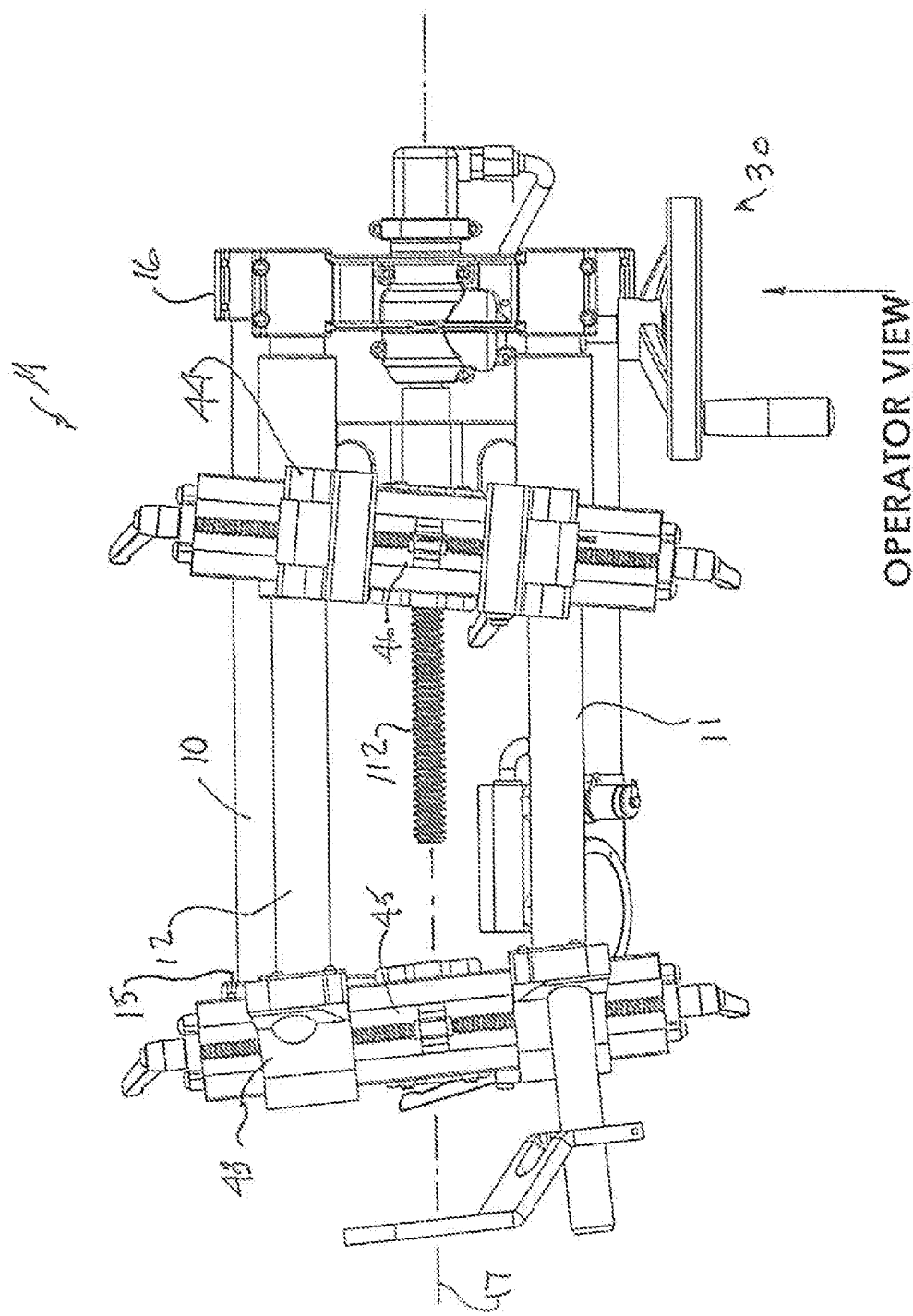

PIPE FUSION MACHINE

BACKGROUND OF THE INVENTION

This invention relates generally to pipe fusion machines and more particularly concerns a pipe fusion machine with butt and socket fusion capabilities.

Known butt fusion machines use low accuracy force measuring devices such as spring scales that may lead to inferior joint quality. Their force scales are hard to read with course granularity causing the operator to have to estimate or interpolate the force they are using. They do not have the force capabilities to handle high drag situations. They have at best only 15° of miter angle capability in their targeted pipe size range, thus requiring the operator to perform more fusions when creating larger radius bends. Their jaws pivot in only one direction, requiring the operator to rotate the machine or rotate the work piece to create an offset. They employ inconveniently located input mechanisms, causing the operator to provide the input force in a manner not conducive to ergonomic operation. They do not have the capability to adapt joint monitoring devices. They do not support pipes that rotate with their jaws throughout the miter fusion range, possibly resulting in sub optimal joints. They require the use of tools to adjust the configuration of machine, lowering the productivity of the operator. And they cannot be used for socket fusion.

Known socket fusion machines cannot create joints with slight miter angles, thus necessitating, the use of fittings or bend pipe to route around obstacles and increasing cost and causing undue stress on the pipes. They cannot monitor the force used to join the pipe, making verification of use of proper fusion procedure more difficult. And they cannot be used for butt fusion, whether mitered or straight.

It is, therefore, an object of this invention to provide a pipe fusion machine capable of use for both butt and socket fusion. Another object of this invention is to provide a pipe fusion machine that provides a wide range of angles universally selectable for mitered fusion. It is also an object of this invention to provide a pipe fusion machine that monitors forces with high accuracy. A further object of this invention is to provide a pipe fusion machine configured to be operator friendly in performance of the fusion processes. And it is an object of this invention to provide a pipe fusion machine that can be adjusted to a variety of fusion applications without the use of tools.

SUMMARY OF THE INVENTION

In accordance with the invention, a pipe fusion machine has a frame with a reference end and a drive end supporting spaced apart parallel guide rails therebetween in a horizontal plane. A vertically aligned fixed bearing is centered between the guide rails on the reference end of the frame. A carriage is mounted for longitudinal sliding reciprocation on the guide rails toward and from the reference end of the frame. A carriage drive mechanism proximate the drive end of the frame and has a drive gear and drive shaft in a connection adapted to reciprocate the carriage on the guide rails in response to rotational directional force manually applied to the drive mechanism and to permit independent free axial motion of the drive shaft in relation to the drive gear. A hydraulic system with a piston and cylinder is co-operable with the carriage drive mechanism so that, when carriage is met with resistance to axial travel, the drive shaft slides axially in the drive gear to cause the piston to compress fluid in the cylinder.

The connection of the drive mechanism and the piston and cylinder of the hydraulic system are further co-operable, at a point of cessation of motion of the carriage, to maintain the carriage at the point of cessation of motion. The pressure of the compressed fluid can be monitored by a transducer and/or a pressure gauge.

For fusing pipe in straight or mitered alignment, whether for butt or socket fusion, a pipe fusion machine has a frame a reference end and a drive end supporting spaced apart parallel guide rails in a horizontal plane. A carriage is mounted to slide longitudinally on the guide rails. One vertically aligned bearing is centered between the guide rails on the reference end of the frame. Another vertically aligned bearing is centered between the guide rails on the carriage. Each of the vertically aligned bearings has an identical clamping mechanism thereon. A carriage drive mechanism proximate the drive end of the frame is configured to reciprocate the carriage on the guide rails in response to directional force applied to the carriage. A fixed butt fusion jaw and a fixed sliding fusion jaw are each adapted for mounting on the frame bearing. A sliding butt fusion jaw and a sliding socket fusion jaw are each adapted for mounting on the carriage bearing. Each of the jaws is adapted for engagement with a corresponding clamping mechanism of a corresponding bearing. Each clamping mechanism is operable between a jaws-released condition and a jaws-locked condition and adapted so that in the jaws-locked condition the clamping mechanisms are able to secure corresponding fixed and sliding butt fusion jaws or corresponding fixed and sliding socket fusion jaws on the frame and carriage bearings, respectively.

Each of the jaws is further adapted to permit its rotation about its center vertical axis in its corresponding bearing in the jaws released condition. Rotation of the jaws about their respective axes is forward and rearward of the vertical plane centered between the guide rails. The frame and the carriage each have an identical rotational index and each jaw has an angle registration line at the vertical plane co operable with a corresponding index to universally indicate an angular position of the jaw in relation to its respective frame or carriage. Each jaw may further have a telescoping pipe support mounted on and rotatable with the jaw.

For use in socket fusion of polyolefin pipe at mitered angles, the machine has a frame with a reference end and a drive end supporting spaced apart parallel guide rails therebetween in a horizontal plane. A carriage is mounted to slide longitudinally on the guide rails. One vertically aligned bearing is centered between the guide rails on the reference end of the frame. Another vertically aligned bearing is centered between the guide rails on the carriage. Each of the vertically aligned bearings has an identical clamping mechanism thereon. A carriage drive mechanism proximate the drive end of the frame is configured to reciprocate the carriage on the guide rails in response to directional force applied to the carriage. A fixed socket fusion bracket is adapted for mounting on the frame bearing. A sliding socket fusion bracket is adapted for mounting on the carriage bearing. Each of the brackets is adapted for engagement with a corresponding clamping mechanism of a corresponding bearing. The clamping mechanisms are operable between a brackets-released condition and a brackets-locked condition and are adapted in their brackets-locked condition to secure the fixed socket fusion bracket and the sliding socket fusion bracket on the frame and carriage bearings, respectively. The fixed and sliding socket fusion brackets each have a mechanical drive assembly supporting fixed and sliding socket fusion jaws, respectively, for opening and closing front and rear components of respective jaws by sliding reciprocation to and from a center point between the guide rails of the carriage on respective axes transverse to the guide rails.

Each of the brackets is rotatable about its center vertical axis forward of and rearward of a vertical plane centered between the guide rails. The frame and the carriage each have an identical rotational index and each bracket has an angle registration line at the vertical plane co-operable with a corresponding index to universally indicate an angular position of the bracket in relation to a respective frame or carriage.

BRIEF DESCRIPTION OF THE DRAWINGS

Other objects and advantages of the invention will become apparent upon reading the following detailed description and upon reference to the drawings in which:

FIG. 8A is a top plan view of the pipe fusion machine configuration of FIG. 2 adjusted for proximal socket fusion relative to its operator;

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
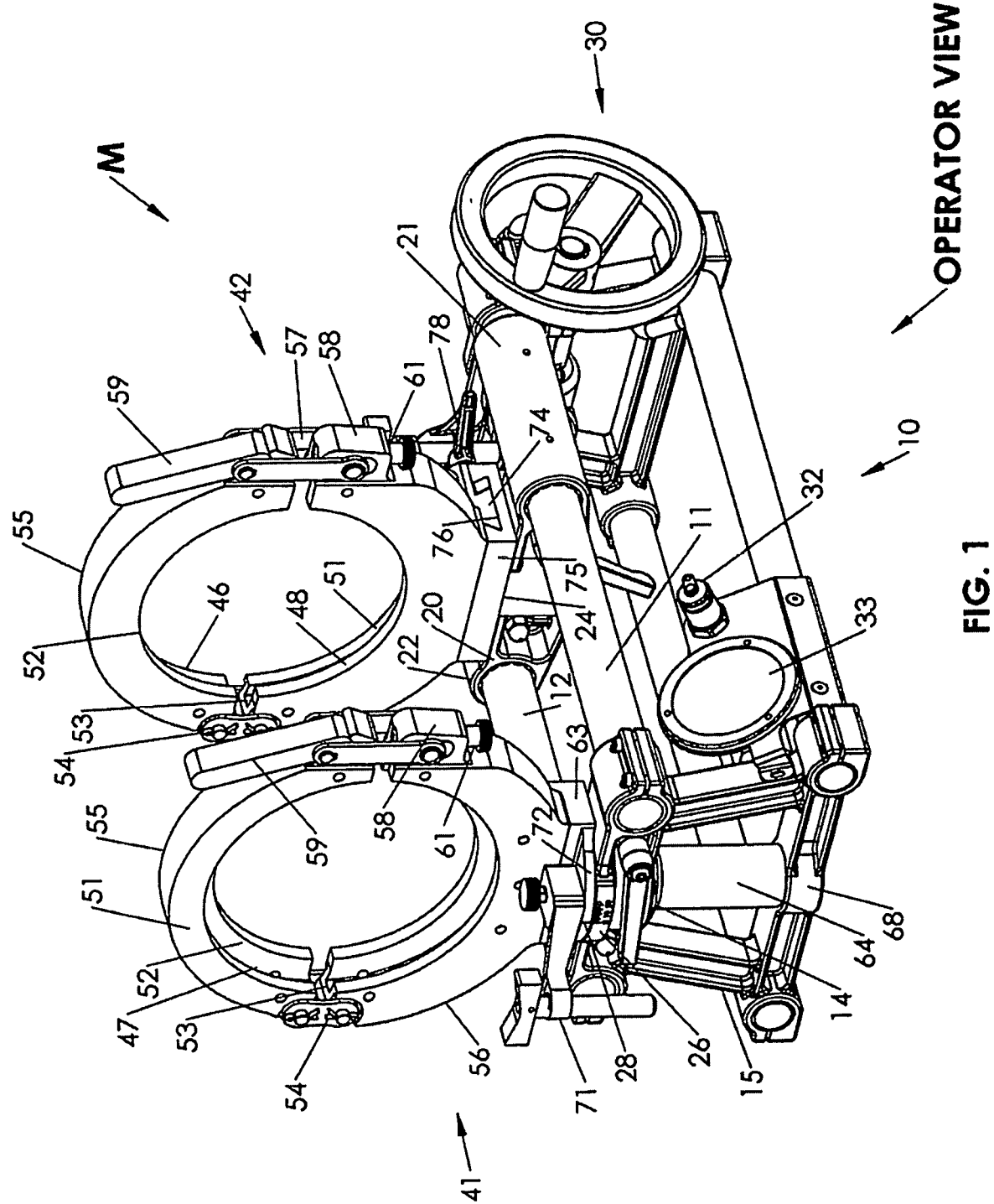
FIG. 1 is a perspective view of a pipe fusion machine according to the invention configured for straight butt fusion.

Looking at FIG. 1, a machine M for fusing polyolefin pipes and fittings is shown in a configuration for use in butt fusion. The term "polyolefin" identifies a most common application of the fusion machine but is intended to include "nylon," PVC and other fusible non-polyolefin pipes and fittings. Looking at FIG. 2, the same machine M is shown in a configuration for use in socket fusion.

Figure 2:
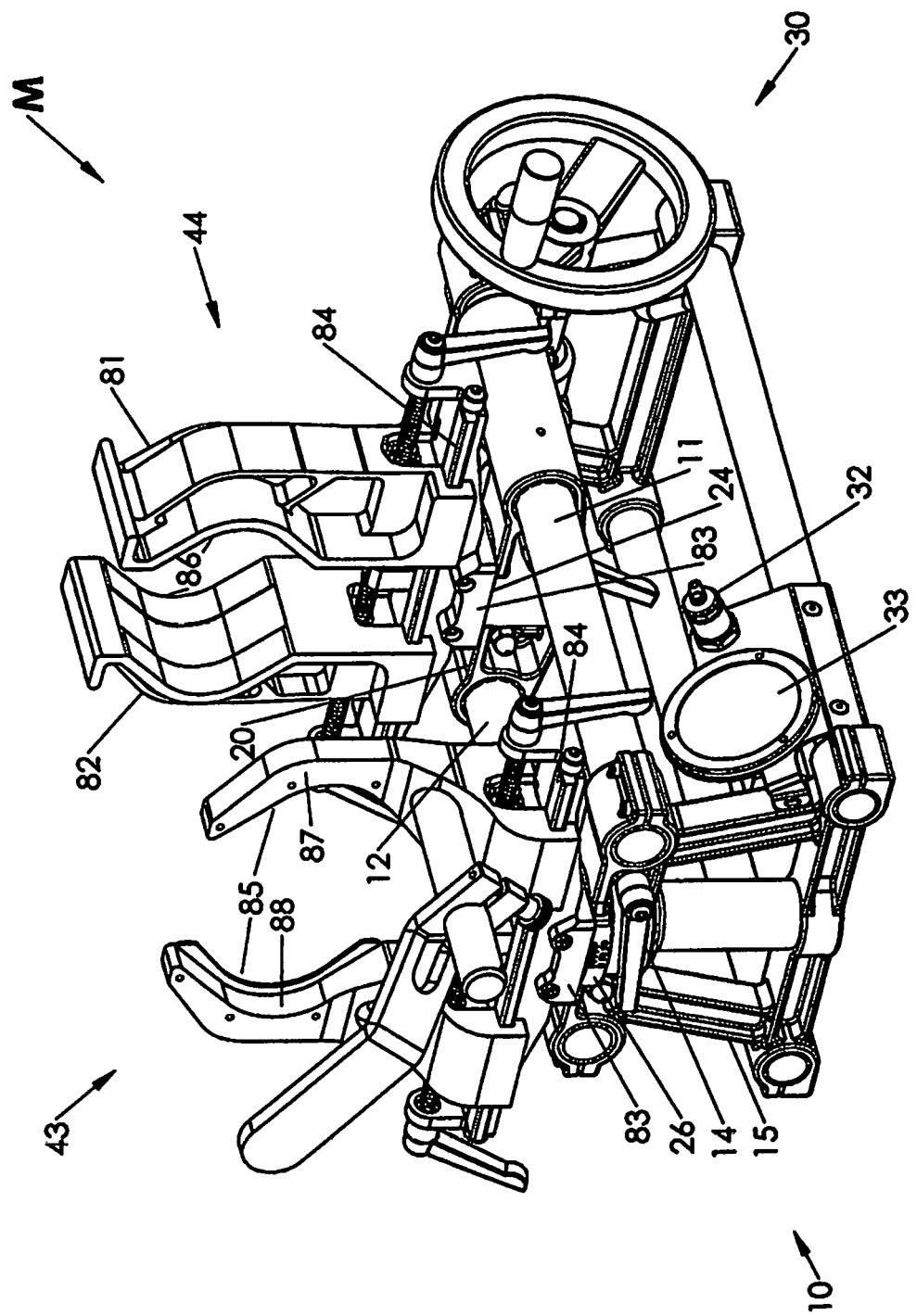
FIG. 2 is a perspective view of a pipe fusion machine according to the invention configured for straight socket fusion.

As is seen in both FIGS. 1 and 2, the machine M has a frame 10 with front and rear elongated, parallel, horizontal, spaced-apart guide rails 11 and 12. A bearing 14 on reference end 15 of the frame 10 is centered on a vertical reference to plane 17 bisecting the space between the guide rails 11 and 12. A carriage 20 has front 21 and rear 22 cylinders sliding on the front and rear guide rails 11 and 12. A bearing 24 on the carriage 20 is also centered on vertical reference plane 17. The outer side portions of the frame 10 and the carriage 20 have identical rotational indexes 26 at the vertical reference plane 17. An index range of 22.5° to either side of the vertical reference plane 17 provides total range of 45° degrees for a bearing 14 or 24. A manually operated mechanical drive system 30 enables operator reciprocation of the carriage 20 on the guide rails 11 and 12 of the frame 10. The drive system 30 has a hydraulic load system 31. The hydraulic load system 31 is monitored by a transducer 32 and a pressure gauge 33. Preferably, and as shown in FIGS. 1 and 2, the frame bearing 14 and the carriage bearing 24 are identical.

Comparing the butt fusion configuration of FIG. 1 with the socket fusion configuration of FIG. 2, the frame and carriage bearings 14 and 24 of the butt fusion configuration support butt fusion fixed and sliding jaws 41 or 42, respectively, and the frame and carriage bearings 14 and 24 of the socket fusion configuration support socket fusion fixed and sliding jaws 43 and 44, respectively.

Figure 3B:
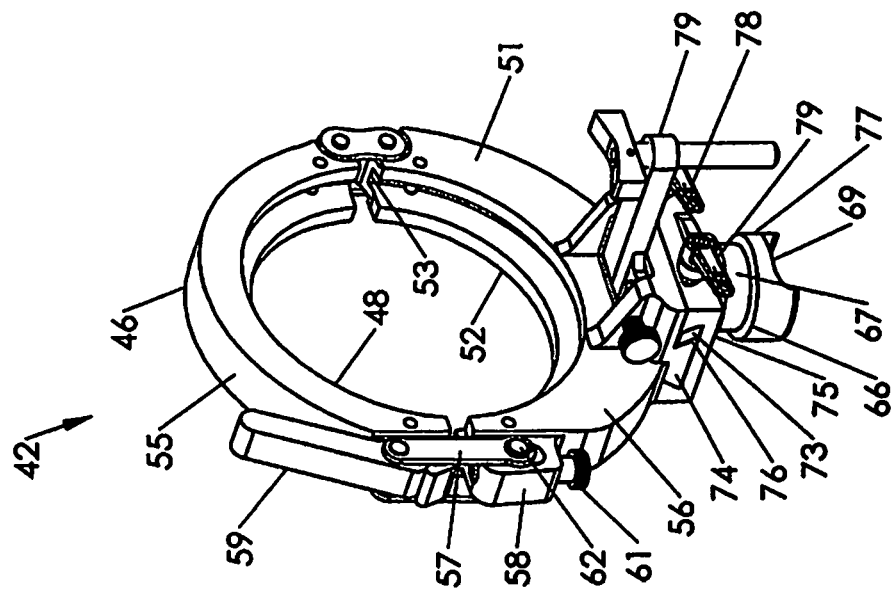
FIG. 3B is a perspective view of a sliding jaw assembly of the pipe fusion machine in the configuration of FIG. 1.
Figure 3A:
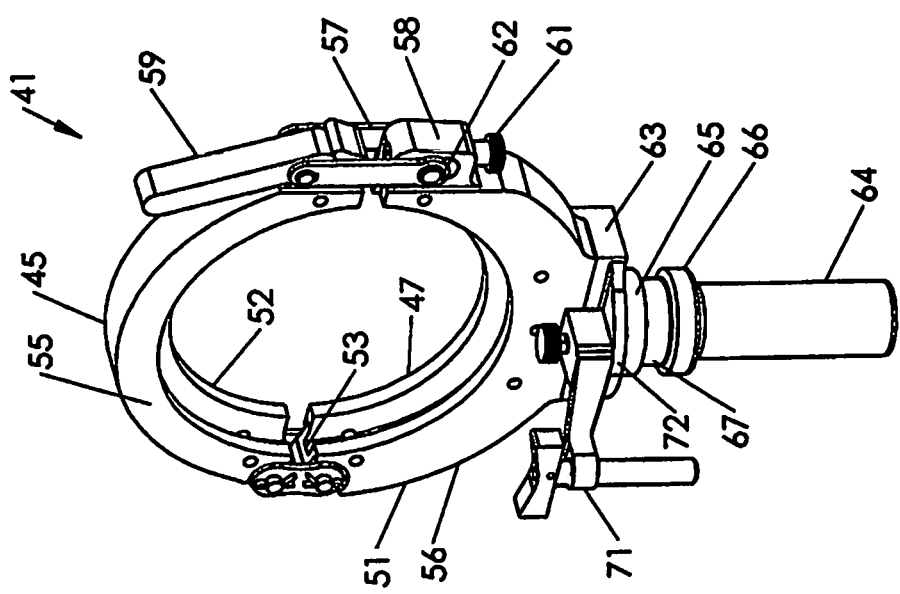
FIG. 3A is a perspective view of a fixed jaw assembly of the pipe fusion machine in the configuration of FIG. 1.

Turning to FIGS. 3A and 3B, the butt fusion fixed and sliding jaws 41 and 42, respectively, are illustrated. The fixed and sliding jaws 41 and 42 have mirror-imaged substantially circular clamps 45 and 46. The clamps 45 and 46 are made of U-shaped cross-section channel 47 and 48 and are sized to secure the largest diameter pipe of the range of pipes to be gripped by the jaw 41 or 42. In relation to the frame 10, the outermost wall 51 of the channel 47 or 48 has a larger inside diameter than the innermost wall 52 of the U-shaped channel 47 or 48. Therefore, only the edge of the innermost wall 52 will make contact with the pipe to be gripped. The channel 47 or 48 provides a groove 53 into which adapters (not shown) sized for gripping smaller diameters of pipe within the range of the jaw 41 or 42 can be inserted. Each of the gripping edges of the channel 47 or 48, or any insert, may be serrated. The clamp 45 or 46 is split into upper and lower segments 55 and 56 hinged at the rear of the clamp 45 or 46 in spaced apart relationship by a linkage 54 pivotally connected to each segment 55 and 56. A latch 58 mounted on the front of the lower segment 56 of the clamp 45 or 46 has a lever 59 engageable with the upper segment 55 of the clamp 45 or 46. The lever 59 is spaced from the latch 58 by a linkage 57 pivotally connected to the latch 58 and the lever 59. A screw 61 on the latch 58 engages a latch pivot 62 to permit adjustment of the force applied by the clamp 45 or 46.

Looking at FIGS. 1 and 3A, the lower segment 56 of the butt fusion fixed jaw clamp 45 has a bracket 63 fixed on top of a post 64. Immediately below the bracket 63, two concentric rings 65 and 66 define a groove 67. As seen in FIG. 1, the bracket 63 will be seated on the frame 10 with the rings 65 and 66 and groove 67 disposed inside of the frame or reference bearing 14. The post 64 extends down to a seat 68 in the frame 10. A telescoping pipe support 71 mounted on a clamp bracket extension 72 is adjustable vertically to accommodate the diameter of the pipe to be clamped in the fixed jaw 41.

Looking at FIGS. 1 and 3B, the lower segment 56 of the butt fusion sliding jaw clamp 46 has a transversely extending trapezoidal cross-section tongue 74. A bracket 75 with a complementary groove 76 wider than the tongue 74 is fixed to the top of a post 77. The narrower tongue 74 slides in the wider groove 76 and can be locked in a desired transverse position by the operation of rear and front levers 78 against the gib 73 to pin the tongue 74 against the groove 76. As seen in FIG. 1, the bracket 75 will be seated on the carriage 20 with the rings 65 and 66 and the post groove 67 inside of the carriage bearing 24. The concentric rings 65 and 66 provide an identical groove 67 on the butt fusion sliding jaw clamp 46 as the groove 67 on the butt fusion fixed jaw clamp 45. As seen in FIG. 3B, the lower concentric ring 66 is downwardly extended and has an arcuate channel 69 in its bottom surface. A telescoping pipe support 79 mounted on the grooved bracket 75 is adjustable vertically to accommodate the diameter of the pipe to be clamped in the sliding jaw 42.

Figure 4B:
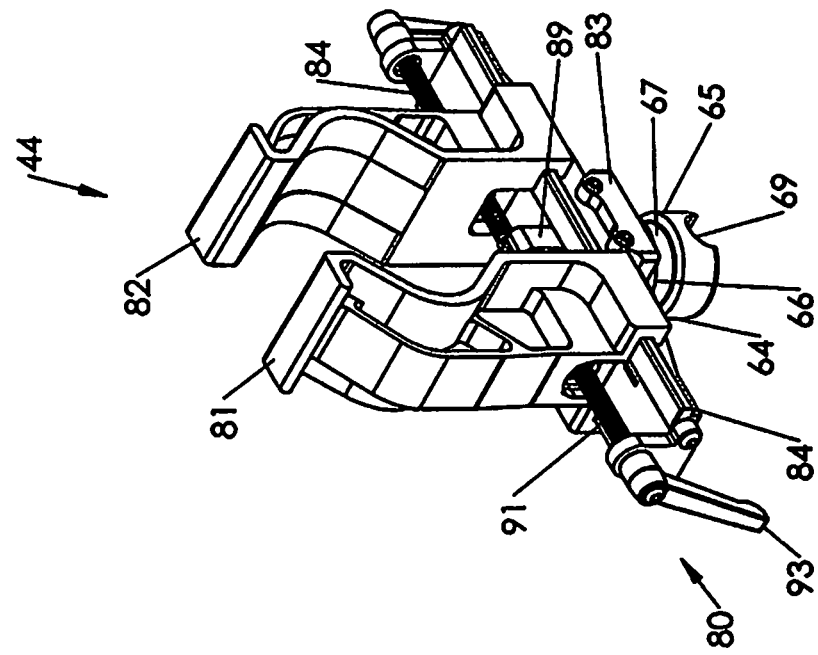
FIG. 4B is a perspective view of a sliding jaw assembly of the pipe fusion machine in the configuration of FIG. 2.
Figure 4A:
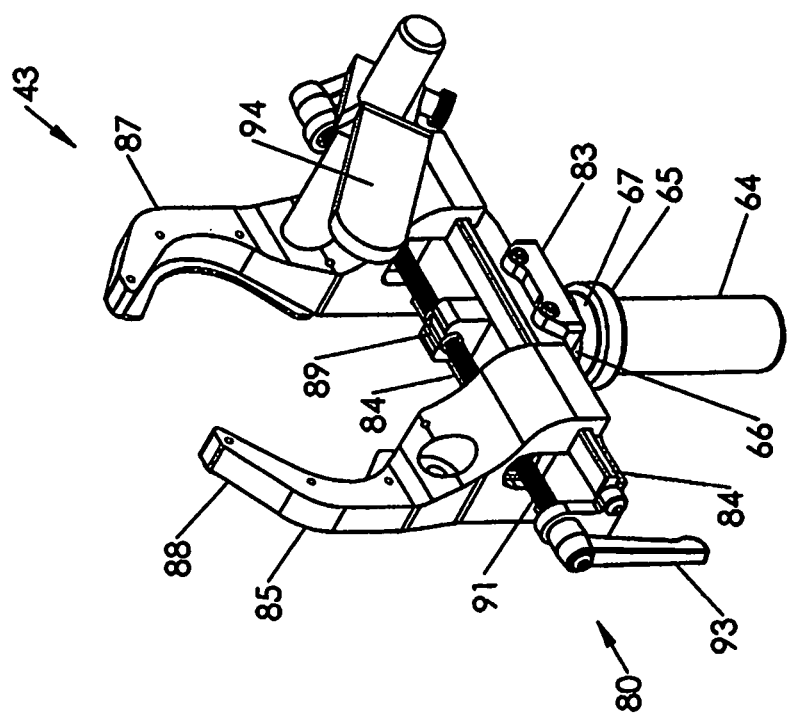
FIG. 4A is a perspective view of a fixed jaw assembly of the pipe fusion machine in the configuration of FIG. 2.
Figure 5B:
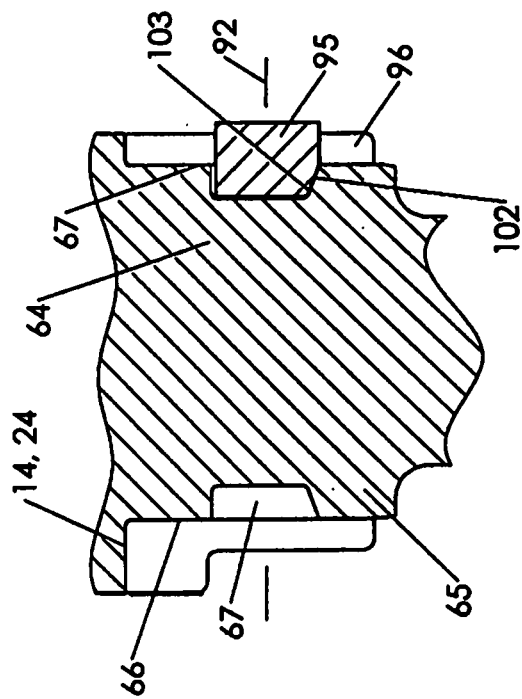
FIG. 5B is a cross-sectional view taken along the line 5B-5B of FIG. 5A.
Figure 5A:
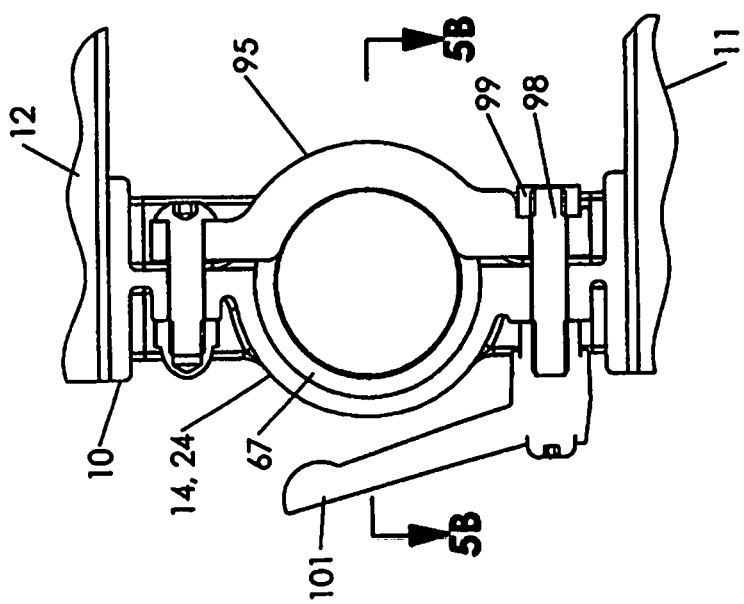
FIG. 5A is a cross-sectional view, taken in a horizontal plane bisecting the guide rods of the frame, of the fixed and sliding jaw pivot bearings of FIGS. 1 and 2.

Turning to FIGS. 4A and 4B, the socket fusion fixed and sliding jaws 43 and 44, respectively, are illustrated. The socket fusion fixed jaw 43 has a post 64 with concentric rings 65 and 66 and a groove 67 identical to that of the butt fusion fixed jaw 41. However, the bracket 83 at the top of the post 64 of the socket fusion fixed jaw 43 is not the same as the bracket 63 at the top of the post 64 of the butt fusion fixed jaw 41. The socket fusion sliding jaw 44 also has concentric rings 65 and 66 and a groove 67 identical to that of the socket fusion fixed jaw 43. And the bracket 83 at the top of the post 64 of the socket fusion sliding jaw 44 is identical to that of the bracket 83 on the socket fusion fixed jaw 43. However, the lower concentric ring 66 of the socket fusion sliding jaw 44 is downwardly extended and has an arcuate channel 69 in its bottom surface.

Looking at FIGS. 2 and 4A, the socket fusion fixed jaw bracket 83 supports a pair of elongated parallel guides 84 of a mechanical assembly 80 in transverse relationship to the guide rails 11 and 12 of the frame 10 and has a reference bearing 14 on the vertical reference plane 17. Front and rear segments 87 and 88 of the fixed jaw clamp 85 are engaged to slide on the parallel guides 84. The bracket 83 also supports the center point 89 of a horizontal transverse elongated screw 91 threaded oppositely on either side of the center point 89. The front segment 87 of the fixed jaw clamp 85 is engaged on the front threaded portion of the screw 91 and the rear segment 88 of the fixed jaw clamp 85 is engaged on the rear threaded portion of the screw 91 symmetrically in relation to the center bearing 89. Manual operation of a handle 93 on the front end of the screw 91 in one direction closes the space between the clamp segments 87 and 88 and in the opposite direction opens the space between the clamp segments 87 and 88. The clamp 85 is shaped to secure a pipe fitting in longitudinal alignment with the vertical reference plane 17. An adjustable brace 94 is telescopically mounted on the outside of the fixed jaw 43 to prevent travel of the fitting away from the jaw 43.

Looking at FIGS. 2 and 4B, the socket fusion sliding jaw clamp 86 is identical to the socket fusion fixed jaw clamp 85 except that the clamp 85 is shaped to secure a fitting and the clamp 86 is shaped to secure a pipe in longitudinal alignment with the vertical reference plane 17 and has no brace.

Looking now at FIGS. 1, 2, 5A and 5B, the rotational adjustability of any of the butt fusion fixed and sliding jaws and socket fusion fixed and sliding jaws in their respective bearings can be understood. With the jaw rings 65 and 66 inserted into the bearings 14, 24 until the bracket 63, 75 or 83 strikes the top of the bearing 14, 24, at which point the groove 67 lies in a horizontal plane 92 bisecting the guide rails 11 and 12, a clamp 95 is inserted through the bearing wall 96 into the groove 67 to retain the jaw at that level in the bearing 14, 24. The rear end of the clamp 95 is bolted to the frame 10. A stud 98 extends through the front end of the clamp 95 and the frame 10 and is secured against the frame 10 by a threaded handle 101 accessible to the operator and a nut 99. The lower inside corner of the clamp 95 has a bevel 102 and engages a complementary bevel 103 on the bottom of the groove 67.

When the operator has adjusted an angle registration line 28 on the jaw at the vertical reference plane 17 with the desired angle on the rotational indexes 26 of the respective frame 10 or carriage 20, the operator can tighten the grip of the clamp 95 against the groove 67 of the frame 10 or carriage 20. When the clamp 95 is tightened it provides radial torsional resistance and axial force through the wedging action of the bevels 102 and 103. The axial force also provides additional resistance to torsional forces through the frictional interface between the jaw and the frame 10. The axial force ensures the connection between the jaw and the frame 10 is as tight as possible and provides an accurate datum with which to reference the center line of the jaws.

This configuration affords the operator universal selectivity of the angle of the jaw within the range of the index. Typically, for butt fusion a range of 22.5° to either side of the vertical reference plane 17 is used and for socket fusion a range of 5° to either side of the vertical reference plane 17 is used.

Figure 6A:
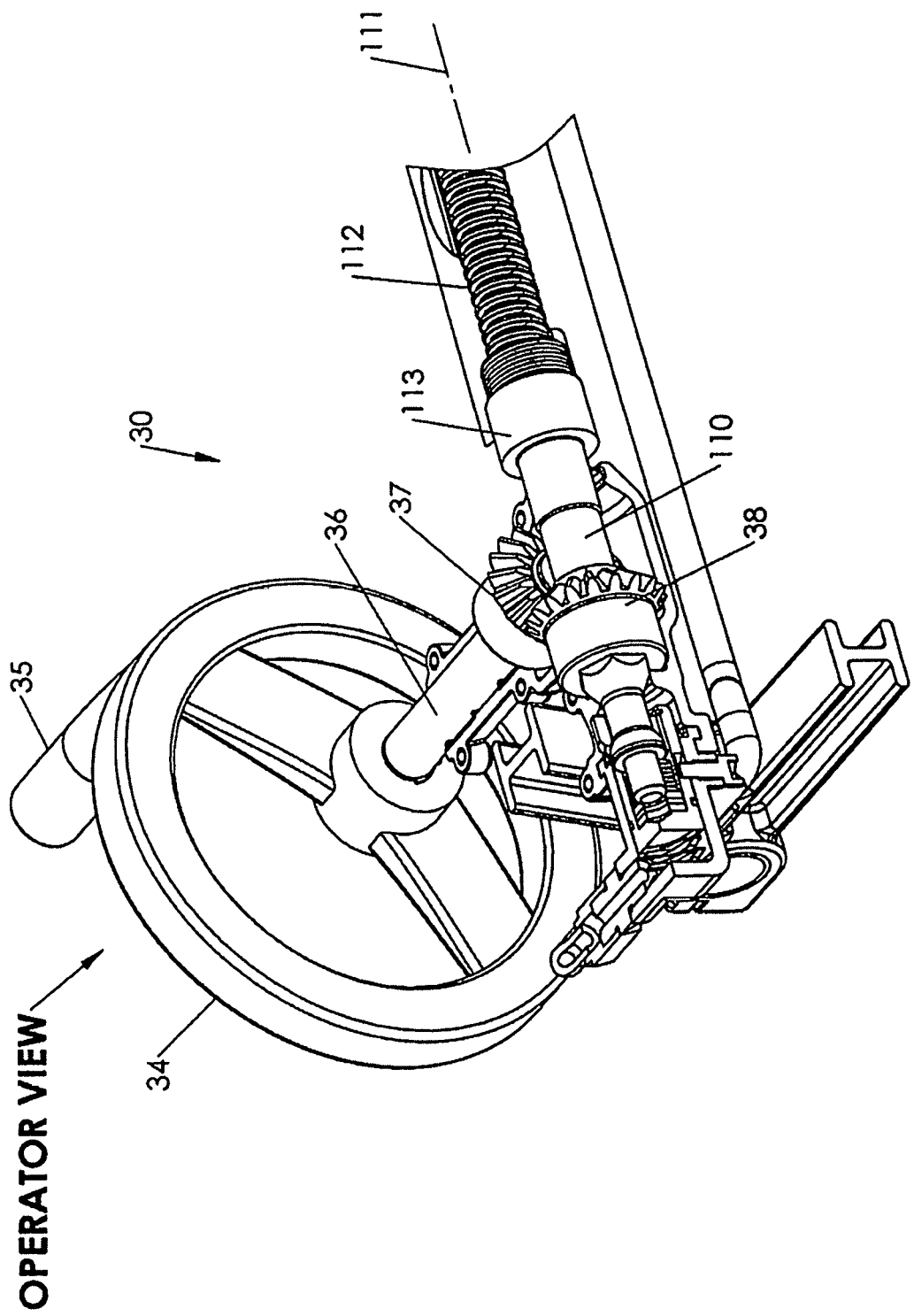
FIG. 6A is a perspective view of the fusion machine drive mechanism and hydraulic system mounted on the right end portion of the base of FIGS. 1 and 2.
Figure 6B:
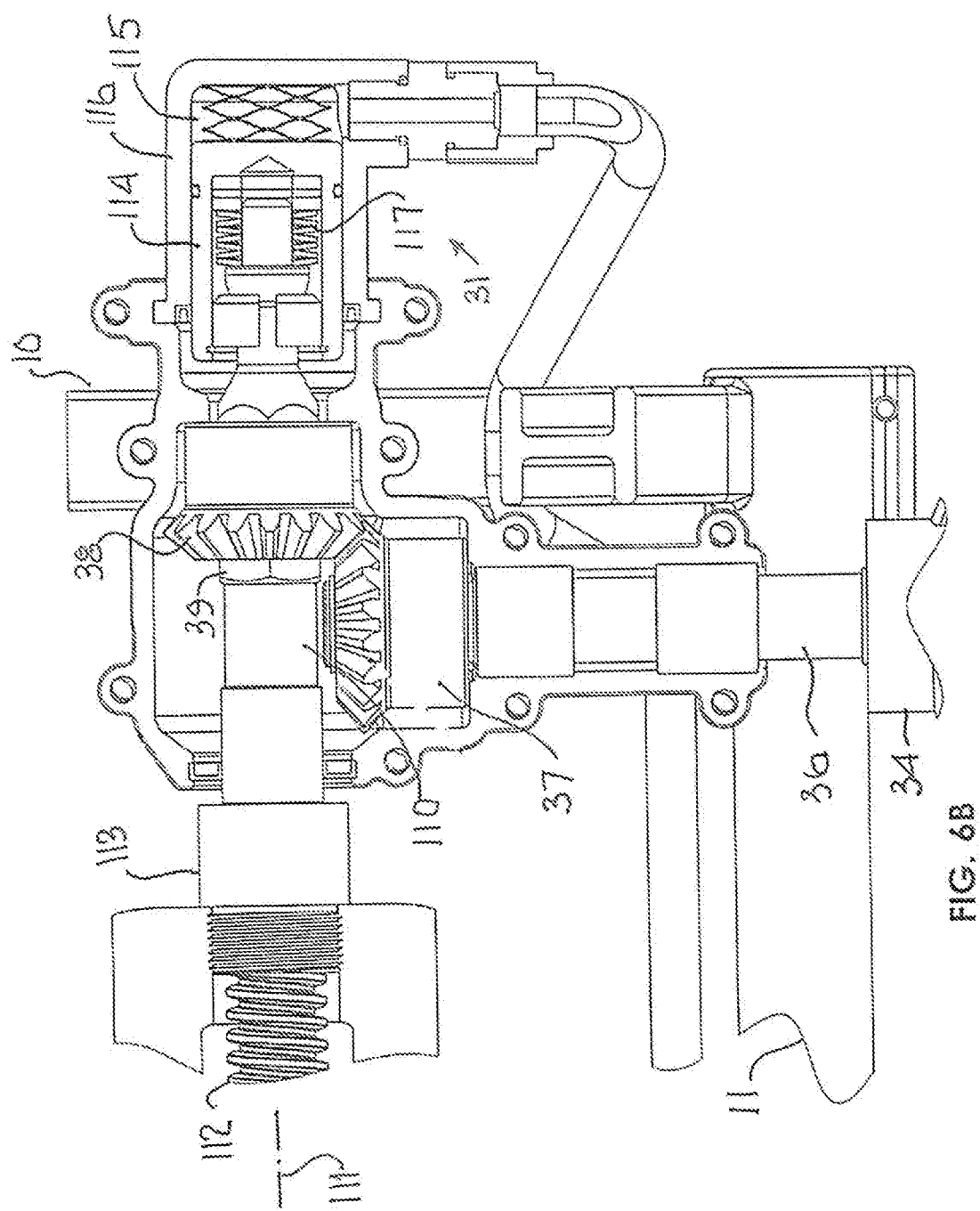
FIG. 6B is an enlarged top plan view of the drive mechanism and hydraulic system of FIG. 6A.

Turning now to FIGS. 6A and 6B, the mechanical drive system 30 of the machine M is mounted on the carriage side of the frame 10. The drive system 30 has an input, as shown a wheel 34 with a handle 35, mounted on an input shaft 36 extending to an input gear 37. From an operator's point of view, when the input wheel 34 is turned counter clockwise, the input gear 37 is also turned counter-clockwise. An output gear 38 engages with the input gear 37 to transfer counter-clockwise motion looking at the front of the machine M 90° to clockwise motion looking from the carriage 20 toward the reference end 15 of the frame 10. The drive gear 38 is connected by a noncircular, as shown a hex, adaptation 39 for rotation with and axial motion in relation to, a driveshaft 110 on a longitudinal axis 111 of the vertical plane 17. A drive screw extension 112 of the drive shaft 110 rotates with the drive shaft 110. The drive screw 112 is coupled to the carriage 20 by a drive nut 113. But the drive nut 113 is fixed rotationally so, when the drive screw 112 is turned clockwise, the carriage 20 is translated axially toward the reference end 15 of the frame 10. When the carriage 20 is met with resistance to axial travel, it causes the drive shaft 110 to slide axially in the drive gear 38 that, in turn, presses on a hydraulic piston 114, compressing the fluid 115 in the hydraulic cylinder 116.

Figure 6C:
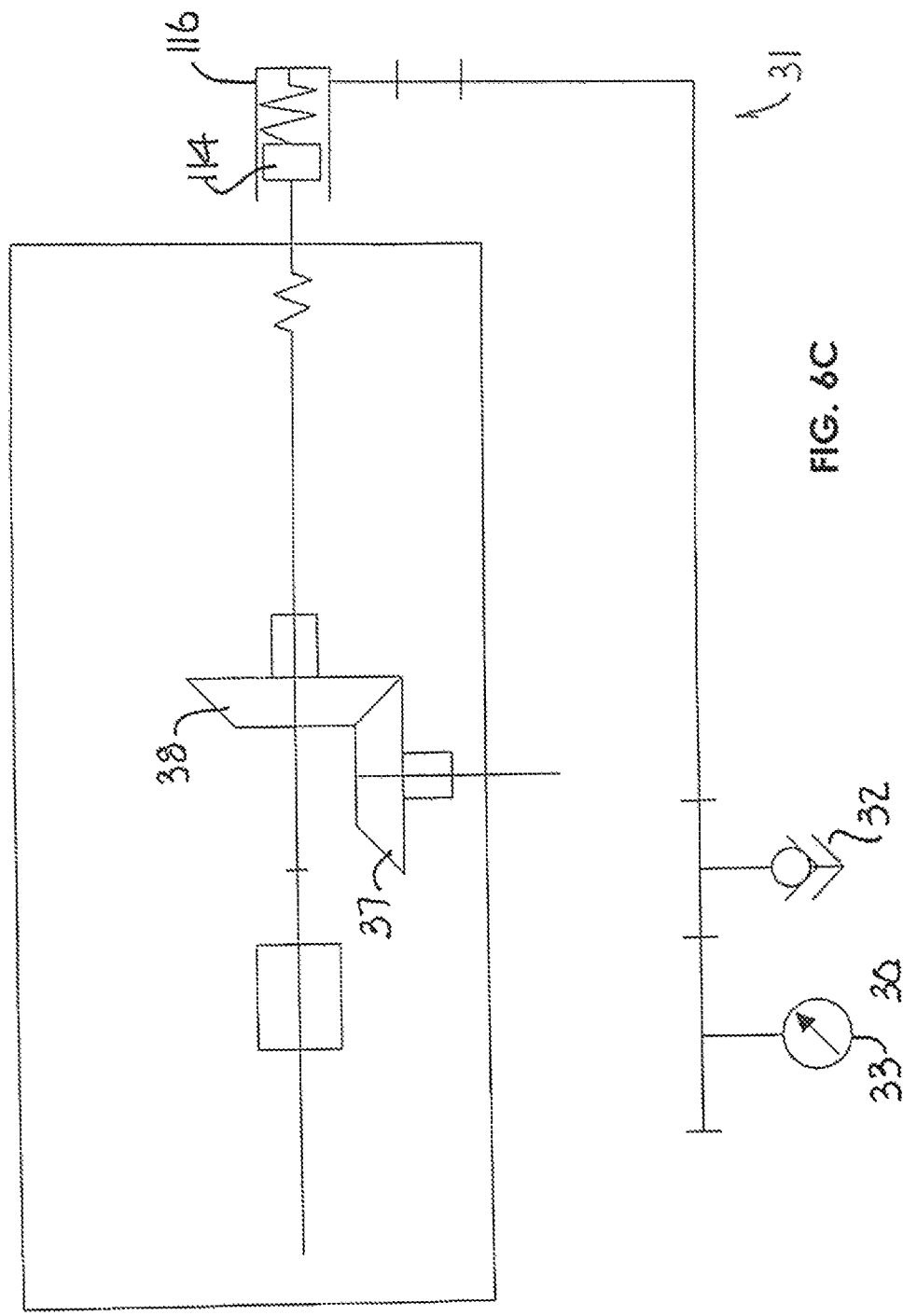
FIG. 6C is a schematic drawing of the hydraulic system of the pipe fusion machine of FIG. 6A.

Looking now at FIGS. 6B and 6C, when the driveshaft slides 110 in the drive gear 38, the adaptation 39 of the drive gear 38 and drive shaft 110 allows torsional transmission of force with free axial movement. When the input motion ceases, the rotational force is eliminated and the carriage 20 is held in position by the non-back driving nature of the drive nut 113 and the drive screw 112 pushing the drive shaft 110 into the piston 114 to compress the fluid 115 in the cylinder 116. As seen in FIG. 6C, as the drive shaft 110 moves through the drive gear 38 toward the carriage end of the frame 10, it compresses a spring 117 in the load cell piston 114 causing the piston to compress the fluid 115 in the load cell housing 116 and increasing the pressure at the transducer port 32 and the pressure gauge 33. The axial force remains and can be monitored electronically or hydraulically, as shown hydraulically, through analog or digital means due to the free sliding nature of the adaptation 39 between the drive shaft 110 and drive gear 38.

When the input rotation is reversed by the operator, the carriage 20 is withdrawn from the reference end 15 of the frame 10 pulling the drive shaft 110 out of the drive nut 113 and with it pulling the load cell piston 114 in the load cell housing 116, releasing fluid pressure in the housing 116 and on the transducer 32 and pressure gauge 33.

Figure 7A:
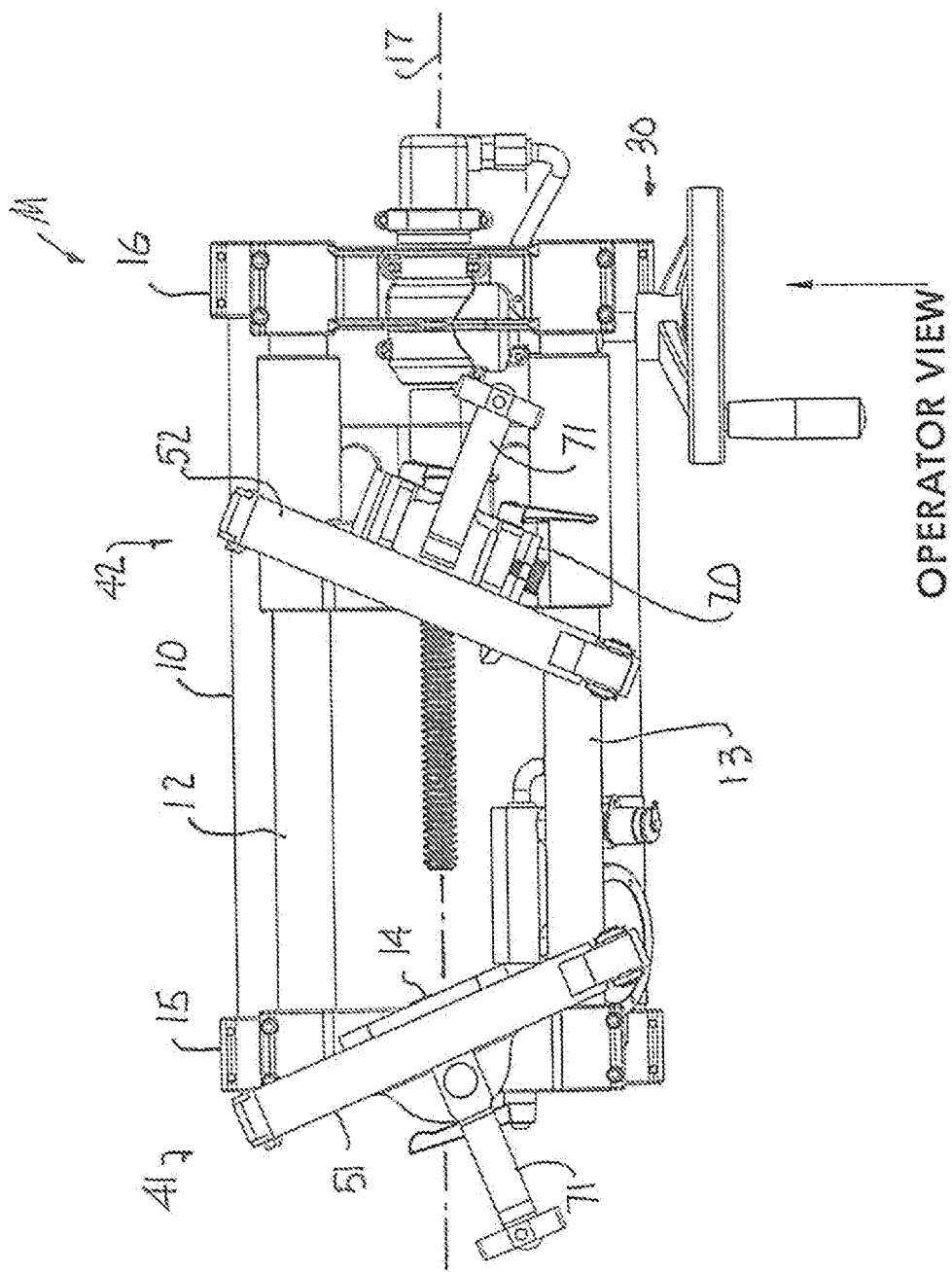
FIG. 7A is a top plan view of the pipe fusion machine configuration of FIG. 1 adjusted for proximal mitered butt fusion relative to its operator.

Turning now to FIG. 7A, for butt fusing pipe in a distal mitered alignment relative to the operator, the pipe fusion machine M has a frame 10 with a reference end 15 and a drive end 16 supporting spaced apart parallel guide rails 11 and 12 in a horizontal plane. The carriage 20 is mounted to slide longitudinally on the guide rails 11 and 12. One vertically aligned bearing 14 is centered between the guide rails 11 and 12 on the reference end 15 of the frame 10. The other vertically aligned bearing 24 is centered between the guide rails 11 and 12 on the carriage 20. Each of the vertically aligned bearings 14 or 24 has a mirrored clamping mechanism 45 or 46 thereon. The carriage drive mechanism 30 proximate the drive end 16 of the frame 10 is configured to reciprocate the carriage 20 on the guide rails 11 and 12 in response to directional force applied to the carriage 20. The butt fusion fixed jaw 41 is adapted for mounting on the frame bearing 14. The butt fusion sliding jaw 42 is adapted for mounting on the carriage bearing 24. Each of the jaws 41 and 42 is adapted for engagement with a corresponding clamping mechanism 95 of a corresponding bearing 14 or 24. Each clamping mechanism 95 is operable between a jaws-released condition and a jaws-locked condition and adapted so that in the jaws-locked condition the clamping mechanisms 95 are able to secure corresponding fixed and sliding butt fusion jaws 41 or 42 on the frame 10 and carriage bearings 14 and 24, respectively.

Each of the jaws 41 or 42 is further adapted to permit its rotation about its center vertical axis in its corresponding bearing 14 and 24 in the jaws-released condition. Rotation of the jaws 41 or 42 about their respective axes is forward and rearward of the vertical reference plane 17 centered between the guide rails 11 and 12. The frame 10 and the carriage 20 each have an identical rotational index 26 and each jaw 41 or 42 has an angle registration line 28 at the vertical reference plane 17 co-operable with a corresponding index 26 to universally indicate an angular position of the jaw 41 or 42 in relation to its respective frame 10 or carriage 20. In the distal butt fusion configuration, each jaw 41 and 42 is rotated until its angle registration line 28 is registered at a desired angle forward of the vertical reference plane 17 between the guide rods 11 and 12. The arcuate channel 69 in the bottom surface of the sliding jaw 42 straddles the drive screw 112 of the drive mechanism 30 and is sufficiently wide to permit the carriage 20 to rotate at least as much as 22.5° forward and rear of the vertical reference plane 17 between the guide rails 11 and 12. If the angles of both jaws 41 and 42 are forwardly rotated 22.5°, a 45° degree miter results and a 90° turn can be accomplished with two miter joints. Each jaw 41 or 42 may further have a telescoping pipe support 71 or 79 mounted on and rotatable with the jaw 41 or 42.

Figure 7B:
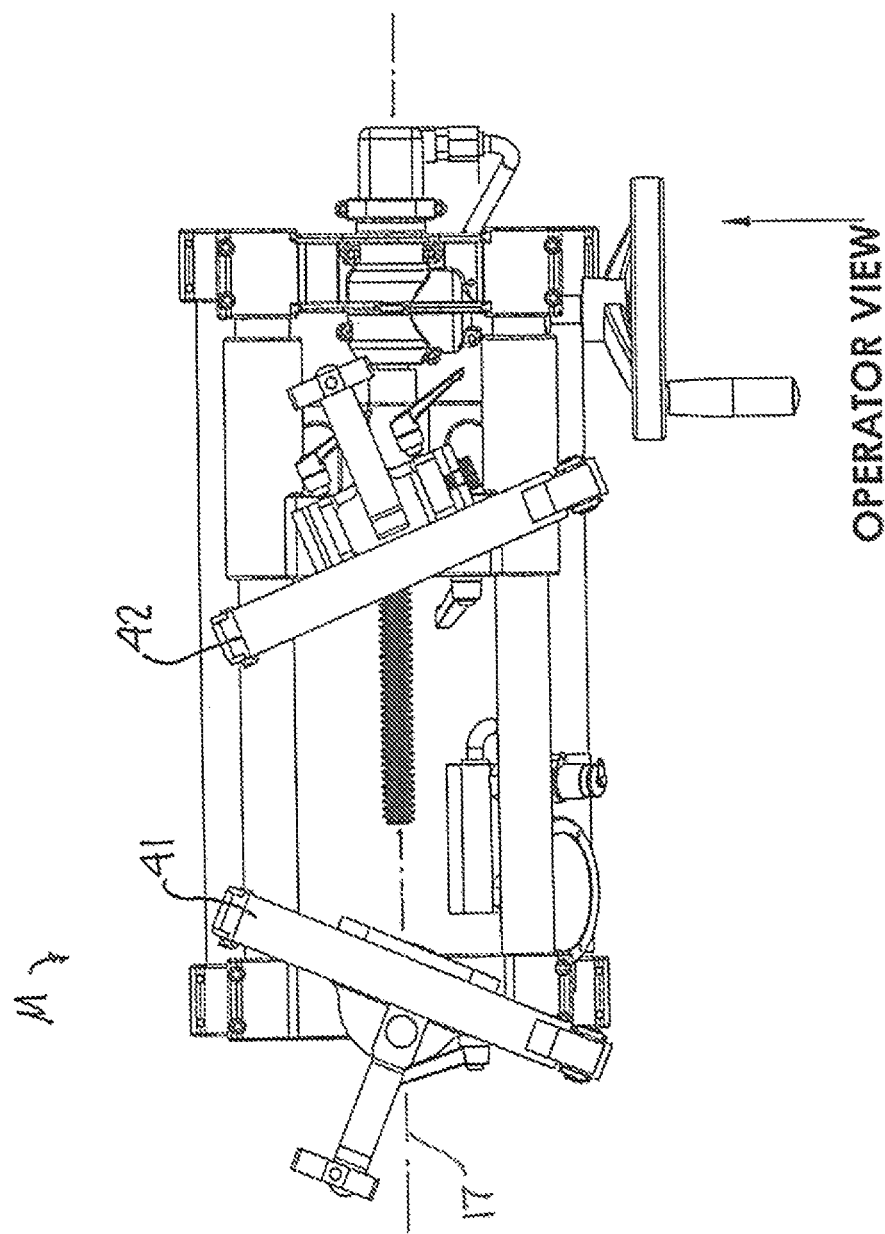
FIG. 7B is a top plan view of the pipe fusion machine configuration of FIG. 1 adjusted for distal mitered butt fusion relative to its operator.

Turning now to FIG. 7B, for butt fusing pipe in a proximal mitered alignment relative to the operator, the pipe fusion machine M is the same as described in reference to FIG. 7A but each jaw 41 and 42 is rotated until its angle registration line 28 is registered at a desired angle rearward of the vertical reference plane 17 between the guide rods 11 and 12.

Looking at FIG. 8A, for use in socket fusion of polyolefin pipe at mitered angles, the machine M has a frame 10 with a reference end 15 and a drive end 16 supporting spaced apart parallel guide rails 11 and 12 therebetween in a horizontal plane. The carriage 20 is mounted to slide longitudinally on the guide rails 11 and 12. One vertically aligned bearing 14 is centered between the guide rails 11 and 12 on the reference end 15 of the frame 10. Another vertically aligned bearing 24 is centered between the guide rails 11 and 12 on the carriage 20. Each of the vertically aligned bearings 14 and 24 has an identical clamping mechanism 95 thereon. The carriage drive mechanism 30 proximate the drive end 16 of the frame 10 is configured to reciprocate the carriage 20 on the guide rails 11 and 12 in response to directional force applied to the carriage 20. The socket fusion fixed bracket 83 is adapted for mounting on the frame bearing 14. The sliding socket fusion bracket 83 is adapted for mounting on the carriage bearing 24. Each of the brackets 83 is adapted for engagement with a corresponding clamping mechanism 95 of a corresponding bearing 14 and 24. The clamping mechanisms 95 are operable between a brackets-released condition and a brackets-locked condition and are adapted in their bracket-locked condition to secure the socket fusion fixed bracket 83 and the sliding socket fusion bracket 83 on the frame and carriage bearings 14 and 24, respectively. The fixed and sliding socket fusion brackets 83 each have a mechanical drive assembly 80 supporting fixed and sliding socket fusion jaws 43 and 44, respectively, for opening and closing front and rear components 87 and 88 or 81 and 82 of respective jaws 43 and 44 by sliding reciprocation to and from a center point 89 between the guides 84 of the carriage 20 on respective axes transverse to the guide rails 11 and 12 of the frame 10.

Each of the brackets 83 is rotatable about its center vertical axis forward of and rearward of the vertical reference plane 17 centered between the guide rails 11 and 12. The frame 10 and the carriage 20 each have an identical rotational index 26 and each bracket 83 has an angle registration line 28 at the vertical reference plane 17 co-operable with a corresponding index 26 to universally indicate an angular position of the bracket 83 in relation to a respective frame 10 or carriage 20.

In the distal socket fusion configuration, each bracket 83 is rotated until its angle registration line 28 is registered at a desired angle forward of the vertical reference plane 17. The arcuate channel 69 in the bottom surface of the bracket 83 straddles the drive screw 112 of the drive mechanism 30 and is sufficiently wide to permit the carriage 20 to rotate at least as much as 5° forward and rear of the vertical reference plane 17. If the angles of both jaws 43 and 44 are forwardly rotated 5°, a 10° degree miter results.

Figure 8B:
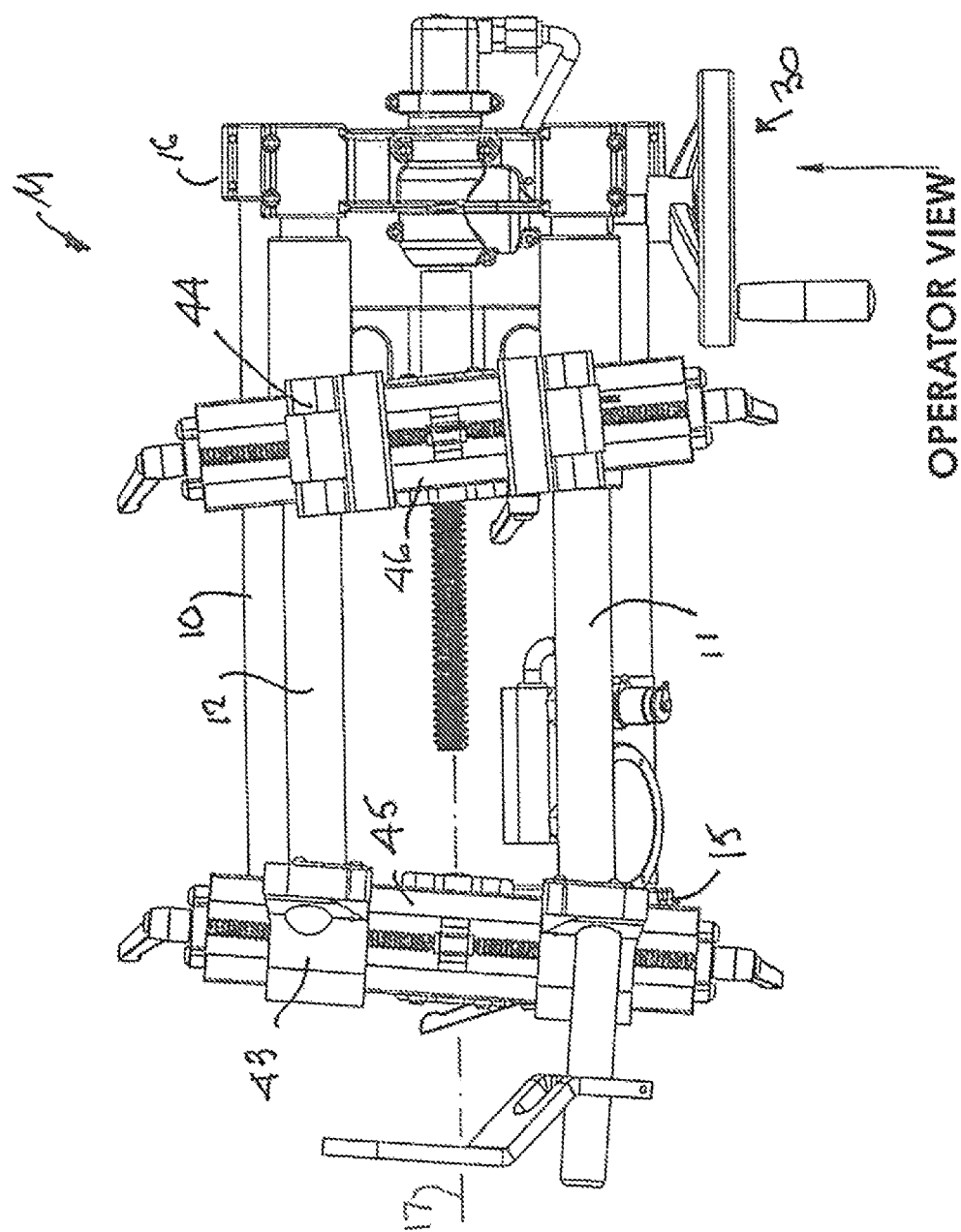
FIG. 8B is a top plan view of the pipe fusion machine configuration of FIG. 2 adjusted for distal socket fusion relative to its operator.

Turning now to FIG. 8B, for socket fusing pipe in a proximal mitered alignment relative to the operator, the pipe fusion machine M is the same as described in reference to FIG. 8A but each bracket 83 is rotated until its angle registration line 28 is registered at a desired angle rearward of the vertical reference plane 17.

Figure 9A:
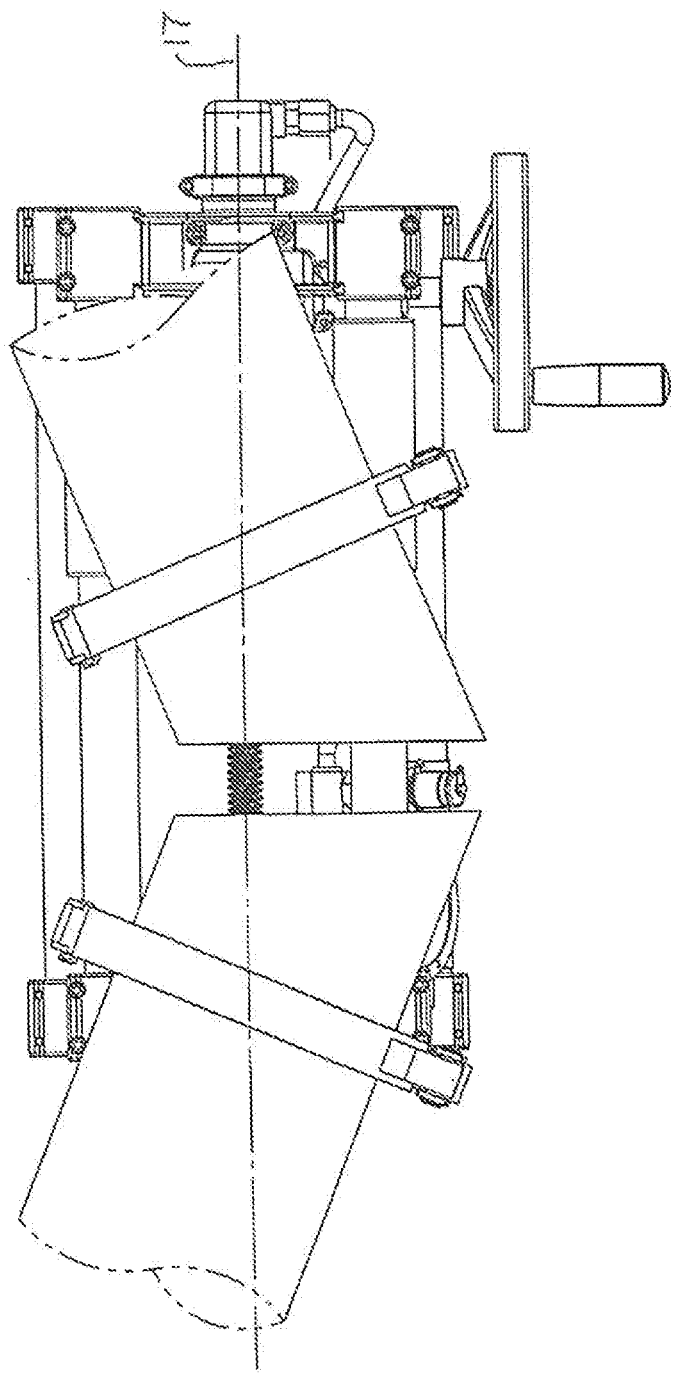
FIG. 9A is a top plan view of the adjusted pipe fusion machine configuration of FIG. 7A.
Figure 9B:
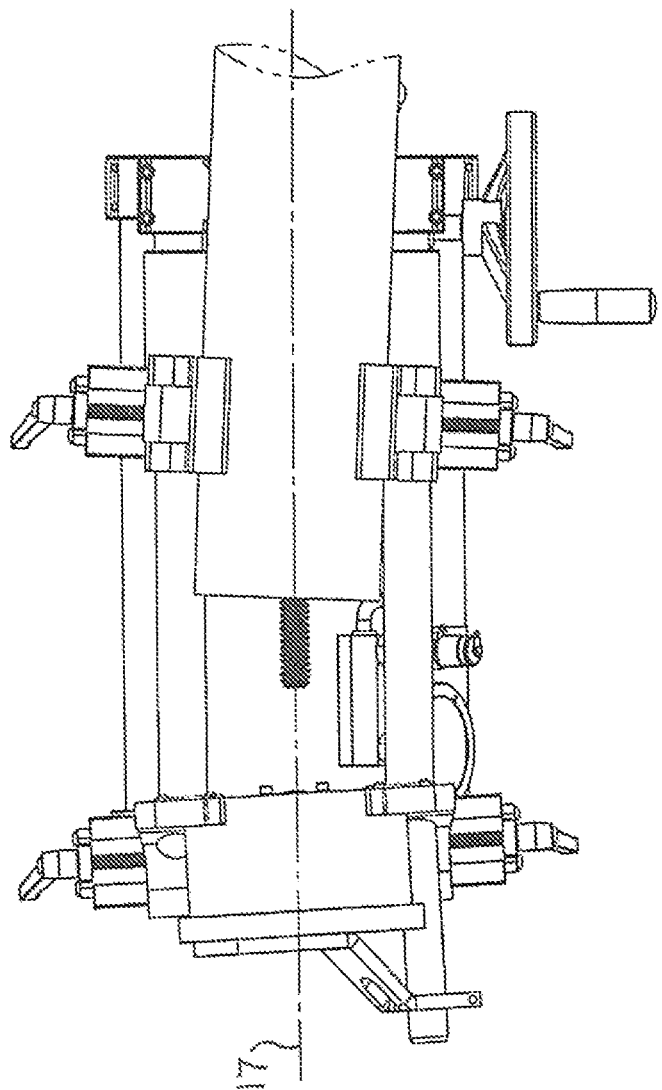
FIG. 9B is a top plan view of the adjusted pipe fusion machine configuration of FIG. 8B.

Looking at FIG. 9A, the machine M is seen in the butt fusion mitered joint configuration of FIG. 7B with pipes P mitered and ready for fusion at a proximal angle from the viewpoint of an operator standing in front of the machine M. In FIG. 9B, the machine M is seen in the socket fusion mitered joint configuration of FIG. 8A with a socket S and a pipe P mitered and ready for fusion at a distal angle from the viewpoint of an operator standing in front of the machine M.

The machine M illustrated in the drawings is capable of use in any or all of the butt and the socket fusion configurations herein discussed.

Thus, it is apparent that there has been provided, in accordance with the invention, a pipe fusion machine that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For fusing polyolefin pipe, a machine comprising:
   a frame having a reference end and a drive end supporting spaced apart parallel guide rails therebetween in a horizontal plane;
   a vertically aligned fixed bearing centered between said guide rails on said reference end of said frame;
   a carriage mounted for longitudinal sliding reciprocation on said guide rails toward and from said reference end of said frame;
   a carriage drive mechanism proximate said drive end of said frame and having a drive gear and drive shaft in a connection adapted to reciprocate said carriage on said guide rails in response to rotational directional force manually applied thereto and to permit independent free axial motion of said driveshaft in relation to said drive gear; and
   a hydraulic system having a piston and cylinder co-operable with said carriage drive mechanism whereby, when said carriage is met with resistance to axial travel, said drive shaft slides axially in said drive gear to cause said piston to compress fluid in said cylinder.

2. A machine according to claim 1, said connection of said carriage drive mechanism and said piston and cylinder of said hydraulic system being further co-operable, at a point of cessation of motion of said carriage, to maintain said carriage at said point of cessation.

3. A machine according to claim 1, a pressure of said compressed fluid being monitored by a transducer and a pressure gauge.

* * * * *